3,692,476
METHOD OF PREPARING OCIF₃
Donald Pilipovich, Canoga Park, and Carl J. Schack, Chatsworth, Calif., assignors to North American Aviation, Inc.
No Drawing. Filed May 13, 1966, Ser. No. 551,490
Int. Cl. C01b 11/00, 11/02
U.S. Cl. 423—466      4 Claims This invention relates to a method of synthesizing oxychlorine trifluoride. In co-pending application, Ser. No. 543,493, filed Apr. 13, 1966, having a common assignee, oxychlorine trifluoride, $OClF_3$, was disclosed as a new oxidizer compound. Additionally, two methods of the compound are set forth. One of the methods relates to reacting $Cl_2O$ with fluorine. While the second method comprises reacting $Cl_2O$ with an alkali metal fluoride to form a complex with subsequent fluorination of the complex to obtain $OClF_3$.

The object of the herein invention is to disclose additional methods of making the oxidizer $OClF_3$ in higher yields.

Both of the methods of this invention involve reacting fluorine with chlorine nitrate to obtain $OClF_3$. The first method of this invention involves complexing chlorine nitrate with an alkali metal fluoride powder. The second method involves reacting fluorine and chlorine nitrate in the absence of a complexing agent.

FIRST METHOD

In the first method, fluorine is then added and the reaction transpires, proceeding at a low temperature, under 20° C., to produce oxychlorine trifluoride according to the following reactions:

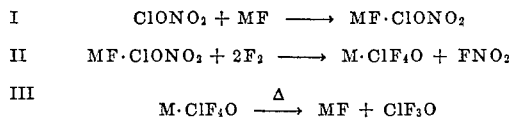

I     $ClONO_2 + MF \longrightarrow MF \cdot ClONO_2$

II    $MF \cdot ClONO_2 + 2F_2 \longrightarrow M \cdot ClF_4O + FNO_2$

III   $M \cdot ClF_4O \xrightarrow{\Delta} MF + ClF_3O$

In the above reactions M is an alkali metal.

More specifically, the first method involves condensing the reactants into a suitable reactor which can be of a material such as stainless steel. The reactor is first loaded, for example, with cesium fluoride, CsF, a white hydroscopic powder. The loading takes place in an inert atmosphere chamber. Chlorine nitrate is then admitted to the reactor and allowed to complex with the CsF at a low temperature. There is no shaking or stirring or such required. Fluorine is then added to the reactor and the reaction proceeds to produce $OClF_3$. Using the cesium fluoride as a complexing agent, the reaction has yielded over a 95 percent conversion of $ClNO_3$ to $OClF_3$. In addition to CsF, other alkali metal fluorides, such as NaF, KF, and RbF can be successfully used as complexing agents with the chlorine nitrate.

SECOND METHOD

The same general reaction involving the fluorination of chlorine nitrate can transpire successfully in the absence of alkali metal fluoride powder. The reaction is carried out by reacting the fluorine with chlorine nitrate. After standing for a suitable period at lower than ambient temperatures, the products which are all volatile may be vacuum fractionated. Therefore, no pyrolysis is needed to obtain $ClF_3O$. This second method without the utilization of the alkali metal fluoride can yield in excess of 84 percent conversion of $ClNO_3$ to $OClF_3$.

The reaction temperature of the fluorination of chlorine nitrate in accord with the two methods should be maintained below room temperature in a static system using a closed reactor. In the second method of the invention when a complexing agent is not used, the reaction can be of a flow type rather than a closed reactor. In this case the $ClNO_3$ and $F_2$ can be brought together in a hot tube. The time of the reaction can proceed from shortly after the time that it begins to several days. The ultimate completion of the reaction can be determined by observing the decrease of pressure in the reactor. In carrying out both methods an excess of fluorine over that stoichiometrically required is preferred to ensure complete conversion of the chlorine nitrate. Likewise, when the complexing agent is used, an excess thereof is preferred.

Upon completion of the reactions of both materials, the closed reactor, when such is used, can then be connected to a series of traps maintained at different temperatures. For example, a trap can be conveniently maintained at −196° C., the temperature of liquid nitrogen. In this trap all of the products would remain except fluorine. This, thus, becomes the method for removing from the completed reaction the excess fluorine, if any is present. The nitryl fluoride, $FNO_2$, will pass a trap at −78° C., yet the trap will retain the basic product $OClF_3$. The −78° C. is again a convenient temperature since this is the temperature of Dry Ice. Thus, after removing both the excess fluorine and the nitryl fluoride, the remaining contents are warmed to ambient temperature. The non-volatiles present when CsF powder is used which can include $Cs^+ClF_4O$ are pyrolyzed at temperatures up to 250° C. Following are specific examples of the method of making $OClF_3$ according to the invention:

EXAMPLE I

A 5.5 gram sample of CsF was loaded into a 75 milliliter stainless steel cylinder which was situated in a dry box so that no moisture would contact the CsF. Following, 75 cc. of $ClNO_3$ was condensed into the cylinder at −196° C. The cylinder was then closed and kept at −18° C. for two days to form the CsF complex of $ClNO_3$. At this point, 2 liters of $F_2$ were condensed into the cylinder at −196° C. After six days at −78° C. the excess $F_2$ was pumped out of the cylinder or bomb at −196° C., while the remaining room temperature volatiles were fractionated, yielding a large amount of $FNO_2$ and about 25 cc. of $OClF_3$ in the fractionation. The solids remaining in the reactor were then pyrolyzed for 30 minutes with pumping at approximately 200° C. In this manner, an additional 50 cc. of $OClF_3$ was obtained. Overall the reaction yielded greater than 95 percent conversion of $ClNO_3$ to $OClF_3$.

EXAMPLE II

In this example $ClNO_3$ was reacted with $F_2$ in the absence of the cesium fluoride powder. An 87 cc. sample of $ClNO_3$ and approximately 3 liters of $F_2$ were condensed into a 150 ml. stainless steel bomb at −196° C. After six weeks at −78° C. the $F_2$ was pumped off at −196° C. and the remaining material vacuum fractionated. In addition to $FNO_2$, a small amount of $ClF_3$ was found. These two materials were then fractionated off. The desired product, $OClF_3$ was obtained in a 73.5 cc. quantity. This represents an 84 percent yield based on the amount of $ClNO_3$ utilized.

Although the invention has been described and illustrated in detail, it is to be clearly understood that the same is by way of illustration and example only and is not to be taken by way of limitation, the spirit and scope of this invention being limited only by the terms of the appended claims.

We claim:
1. The method of making $OClF_3$ comprising reacting $ClNO_3$ with $F_2$ and recovering $OClF_3$.
2. The method of claim 1 wherein said reaction is carried out at temperatures less than 20° C.
3. The method of claim 1 wherein said $ClNO_3$ is first complexed with an alkali metal fluoride prior to reaction with said $F_2$.
4. The method of claim 3 wherein said alkali metal fluoride is CsF.

References Cited

Stacey et al., Advance in Fluorine Chemistry, vol. 4, 1965, Butterworth, Inc., Washington, D.C., pp. 242, 243, 246 and 249.

LELAND A. SEBASTIAN, Primary Examiner

U.S. Cl. X.R.

423—472